United States Patent
Takagi et al.

(10) Patent No.: US 10,347,133 B2
(45) Date of Patent: Jul. 9, 2019

(54) OPTICAL DEVICE

(71) Applicant: Toyota Jidosha Kabushiki Kaisha, Toyota-shi, Aichi-ken (JP)

(72) Inventors: Mayu Takagi, Toyota (JP); Kohei Hase, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/886,148

(22) Filed: Feb. 1, 2018

(65) Prior Publication Data

US 2018/0225973 A1 Aug. 9, 2018

(30) Foreign Application Priority Data

Feb. 3, 2017 (JP) .................................. 2017-018268

(51) Int. Cl.
| | |
|---|---|
| *G08G 1/16* | (2006.01) |
| *G06K 9/00* | (2006.01) |
| *B60R 1/00* | (2006.01) |
| *B60R 1/10* | (2006.01) |
| *B60R 1/12* | (2006.01) |

(52) U.S. Cl.
CPC ............. *G08G 1/167* (2013.01); *B60R 1/007* (2013.01); *B60R 1/10* (2013.01); *G06K 9/00805* (2013.01); *B60R 2001/1215* (2013.01)

(58) Field of Classification Search
CPC ...................................................... G08G 1/167
See application file for complete search history.

(56) References Cited

U.S. PATENT DOCUMENTS

| | | | |
|---|---|---|---|
| 2017/0227781 A1 | 8/2017 | Banerjee et al. | |
| 2018/0162277 A1* | 6/2018 | Takagi | ..................... B60R 1/007 |
| 2018/0164079 A1* | 6/2018 | Banerjee | .................... F41H 3/00 |

FOREIGN PATENT DOCUMENTS

JP 2016049930 A 4/2016

* cited by examiner

*Primary Examiner* — James M Pontius
(74) *Attorney, Agent, or Firm* — Dinsmore & Shohl LLP (57) ABSTRACT

An optical device displaying an image of a blind spot includes a blind spot-side outward mirror disposed on a blind spot-side of a line of sight with respect to an obstacle; a blind spot-side inward mirror disposed to face the blind spot-side outward minor; an eye point-side inward mirror disposed on an eye point-side of the line of sight with respect to the obstacle; and an eye point-side outward minor disposed to face the eye point-side inward mirror. Each of the blind spot-side inward mirror and the eye point-side inward mirror has a plurality of reflection surfaces, and the reflection surfaces are arranged in parallel with each other and arranged at positions where the reflection surfaces partially overlap with each other.

3 Claims, 7 Drawing Sheets

OPTICAL DEVICE

CROSS-REFERENCE TO RELATED APPLICATIONS

This application claims priority to Japanese Patent Application No. 2017-018268 filed on Feb. 3, 2017, incorporated herein by reference in its entirety.

BACKGROUND

1. Technical Field

The disclosure relates to an optical device that assists in visually recognizing an image of a blind spot blocked by an obstacle.

2. Description of Related Art

A technique relating to an optical device is disclosed in Japanese Patent Application Publication No. 2016-49930 (JP 2016-49930 A). The optical device includes a pair of mirrors including a semi-transmissive mirror provided on a viewer's side, reflecting part of incident light, and transmitting the other part of the incident light, and a mirror facing the semi-transmissive mirror and reflecting the light from the semi-transmissive mirror toward the semi-transmissive mirror; and a light-guiding portion provided on a side window-side and guiding light that generates an image to the pair of mirrors.

SUMMARY

As described in the paragraph 0022 in JP 2016-49930 A, an image of a specified region on a back side of an obstacle cannot be acquired by the technique disclosed in JP 2016-49930 A. Thus, there is still room for improvement to reduce a blind spot as an area that is not visible. In the technique disclosed in JP 2016-49930 A, an image of a visible spot is displayed at a position that differs from an actual position. Furthermore, because the optical device is disposed in, for example, a vehicle, it is desired that the optical device should have a compact configuration so as not to annoy an occupant.

The disclosure provides a compact optical device capable of reducing an area of a blind spot and displaying an image of the blind spot at the same position as that in the case where no obstacle is present.

An aspect of the disclosure relates to an optical device displaying an image of a blind spot where a line of sight is blocked by an obstacle. The optical device includes a blind spot-side outward mirror disposed on a blind spot-side of the line of sight with respect to the obstacle, and reflecting incident light from the blind spot-side, in a direction crossing the line of sight and away from the obstacle; a blind spot-side inward mirror disposed so as to face the blind spot-side outward mirror, and reflecting the light that is reflected by the blind spot-side outward mirror, toward an eye point-side of the line of sight; an eye point-side inward mirror disposed on the eye point-side of the line of sight with respect to the obstacle, and reflecting the light that is reflected by the blind spot-side inward mirror, in a direction crossing the line of sight and approaching the obstacle; and an eye point-side outward mirror disposed so as to face the eye point-side inward mirror, and reflecting the light that is reflected by the eye point-side inward mirror, toward the eye point-side of the line of sight along the line of sight. Each of the blind spot-side inward mirror and the eye point-side inward mirror has a plurality of reflection surfaces, and the reflection surfaces are arranged in parallel with each other and arranged at positions where the reflection surfaces partially overlap with each other when seen from the blind spot-side or the eye point-side.

The optical device according to the above aspect of the disclosure reflects the incident light from the blind spot-side in the direction crossing the line of sight and away from the obstacle with the use of the blind spot-side outward mirror, reflects the light that is reflected by the blind spot-side outward mirror toward the eye point-side of the line of sight with the use of the blind spot-side inward mirror, reflects the light that is reflected by the blind spot-side inward mirror in the direction crossing the line of sight and approaching the obstacle with the use of the eye point-side inward mirror, and reflects the light that is reflected by the eye point-side inward mirror toward the eye point-side of the line of sight along the line of sight with the use of the eye point-side outward mirror. Each of the blind spot-side inward mirror and the eye point-side inward mirror has the plurality of reflection surfaces, and the reflection surfaces are arranged in parallel with each other and arranged at the positions where the reflection surfaces partially overlap with each other when seen from the blind spot-side or the eye point-side.

Thus, the incident light from the blind spot-side can be emitted toward the eye point, and the image of the blind spot can be displayed at a position of the obstacle when seen from the eye point. Thus, the obstacle can be made transparent and thus the obstacle does not block the line of sight. Therefore, the optical device can assist in visually recognizing the image of the blind spot. In addition, as compared to a device in which each of the blind spot-side inward mirror and the eye point-side inward mirror is formed to have one flat reflection surface, the size of the entire optical device can be reduced.

In the optical device according to the above aspect of the disclosure, a reflection surface of the blind spot-side outward mirror may be inclined toward the eye point-side of the line of sight at a first angle with respect to a direction orthogonal to the line of sight and away from the obstacle; each of the reflection surfaces provided in the blind spot-side inward mirror may be inclined toward the blind spot-side of the line of sight at the first angle with respect to a direction orthogonal to the line of sight and approaching the obstacle; each of the reflection surfaces provided in the eye point-side inward mirror may be inclined toward the eye point-side of the line of sight at the first angle with respect to the direction orthogonal to the line of sight and approaching the obstacle; a reflection surface of the eye point-side outward mirror may be inclined toward the blind spot-side of the line of sight at the first angle with respect to the direction orthogonal to the line of sight and away from the obstacle; an arrangement direction of the reflection surfaces of the blind spot-side inward mirror may be inclined toward the eye point-side of the line of sight at a second angle that is larger than the first angle with respect to the direction orthogonal to the line of sight and away from the obstacle; and an arrangement direction of the reflection surfaces of the eye point-side inward mirror may be inclined toward the blind spot-side of the line of sight at the second angle with respect to the direction orthogonal to the line of sight and away from the obstacle.

In the above configuration, the inclination angles of the reflection surface of the blind spot-side outward mirror, the reflection surfaces provided in the blind spot-side inward mirror, the reflection surfaces provided in the eye point-side inward mirror, and the reflection surface of the eye point-side outward mirror are each set to the first angle. The angle of the arrangement direction of the reflection surfaces provided in the blind spot-side inward mirror and the angle of the arrangement direction of the reflection surfaces provided in the eye point-side inward mirror are each set to the second angle. Therefore, it is possible to reduce the size of the entire device while maintaining functions of emitting the incident light from the blind spot-side toward the eye point and displaying the image of the blind spot at the position of the obstacle when seen from the eye point.

In the optical device according to the above aspect of the disclosure, the first angle may be 45°, and the second angle may be an angle that is larger than 45° and smaller than 90°. In the above configuration, as compared to the device in which each of the blind spot-side inward mirror and the eye point-side inward mirror is formed to have one flat reflection surface, a distance of each of the blind spot-side inward mirror and the eye point-side inward mirror from the obstacle can be reduced. Therefore, the size of the entire device can be reduced.

According to the above aspect of the disclosure, an area of the blind spot can be reduced, and the image of the blind spot can be displayed at the same position as that in the case where no obstacle is present. Therefore, the optical device can assist in visually recognizing the image of the blind spot, and the size of the optical device can be reduced as compared to the case where each of the blind spot-side inward mirror and the eye point-side inward mirror is formed to have one reflection surface.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
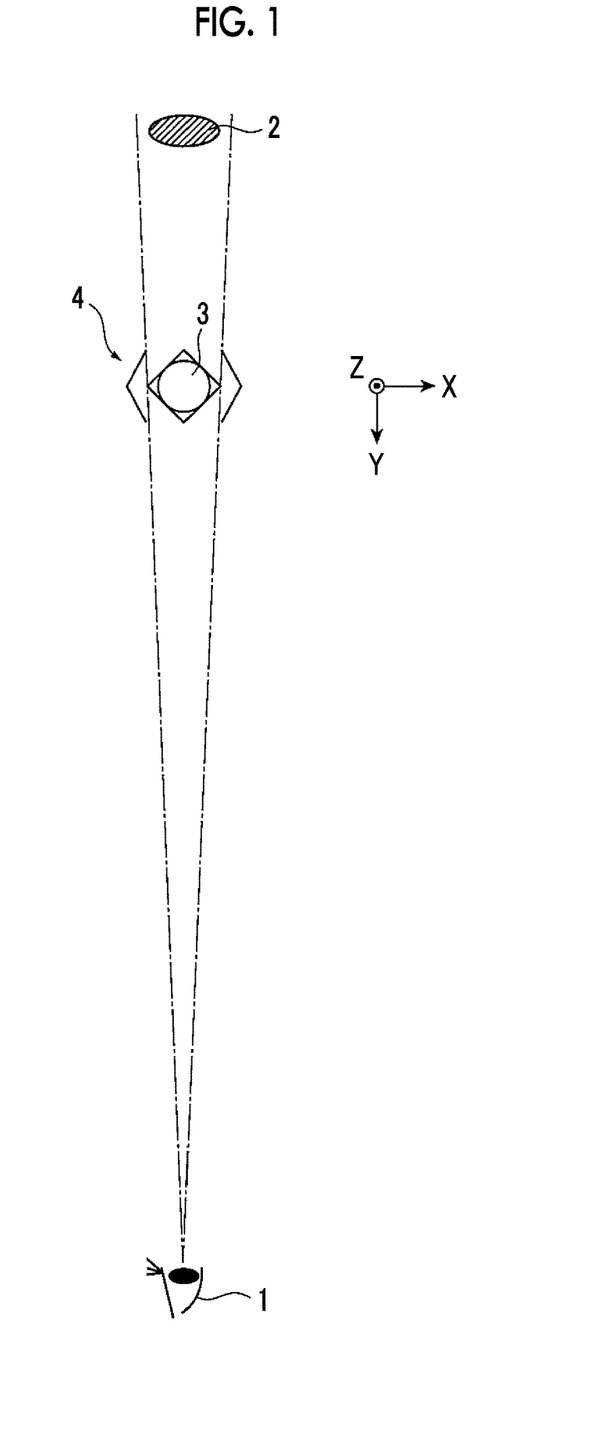
FIG. 1 is a plan view schematically illustrating an optical device in an embodiment.
Figure 2:
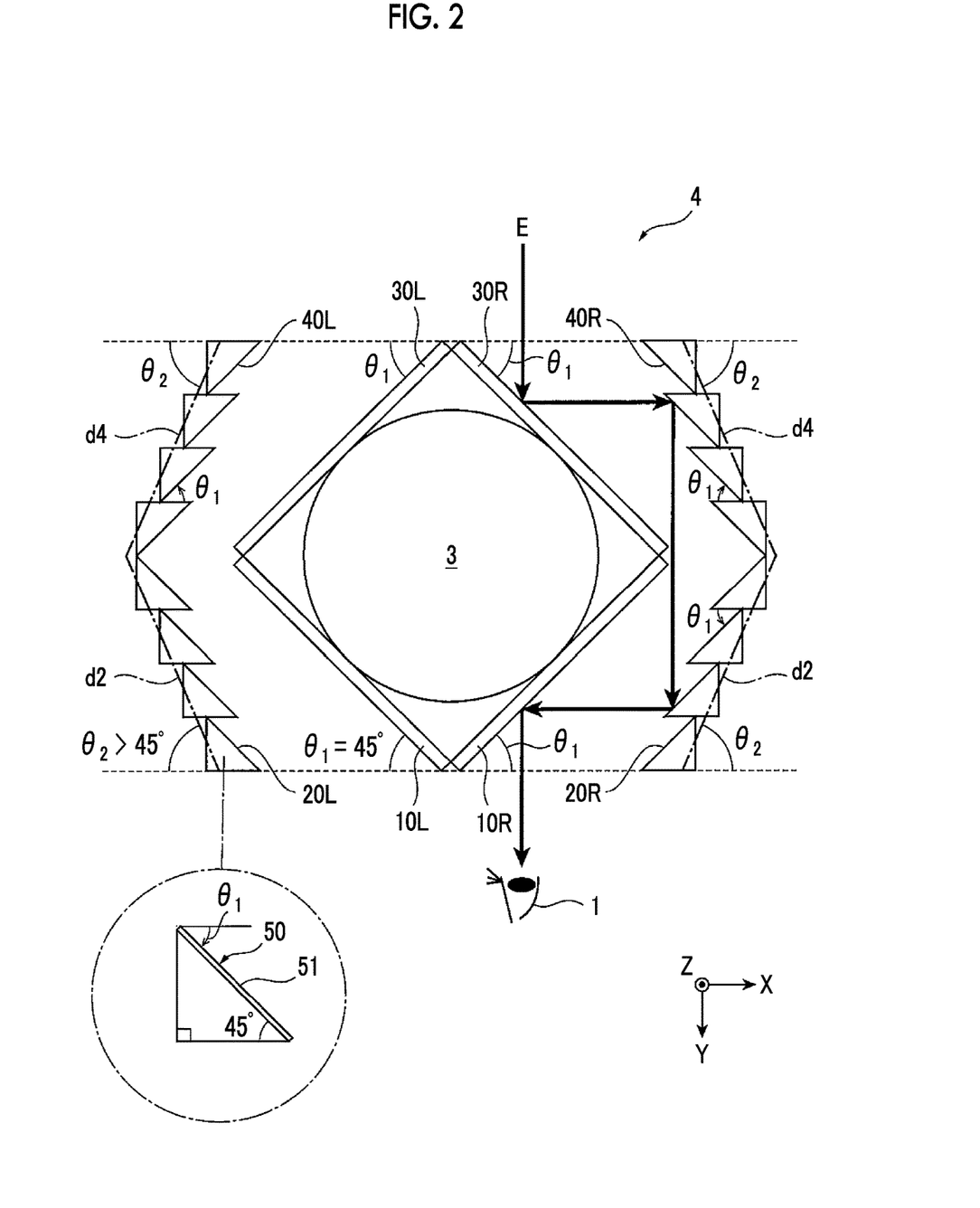
FIG. 2 is a plan view illustrating a configuration of the optical device in the embodiment.

Hereinafter, a description will hereinafter be provided on an optical device according to an embodiment with reference to the drawings. FIG. 1 is a plan view schematically illustrating an optical device 4 in this embodiment. FIG. 2 is a plan view illustrating a configuration of the optical device 4.

The optical device 4 is attached to a vehicle (an automobile), for example. In a case of the vehicle, a driver can directly and visually recognize outside scenery through a windshield and side windows. However, in a region where a front pillar 3 is disposed, a driver's line of sight is blocked by the front pillar 3 that becomes an obstacle. As a result, a blind spot is generated, and the blind spot is a region that is not directly visible from the driver. The optical device 4 has a configuration that makes the front pillar 3 transparent, displays an image of the blind spot at the same position as that in the case where the front pillar 3 is not provided, and assists the driver in visually recognizing an object 2 that exists at the blind spot. Making transparent herein means that an actually-existing object is concealed as if it did not exist, and represents a state where the scenery is not hidden by the obstacle and is visible.

In order to facilitate understanding of a function of each member, in the following description, an axis along a direction (the line of sight) in which the front pillar 3 is seen from an eye point 1 of the driver is set as a Y-axis, an axis along an extending direction of the front pillar 3 is set as a Z-axis, and an axis orthogonal to the Y-axis and the Z-axis is set as an X-axis. A direction of an arrow indicating each of the X-axis, the Y-axis, and the Z-axis is set as a positive direction of the axis, and a direction opposite to the direction of the arrow indicating each of the axes is set as a negative direction of the axis. In this case, the Y-axis positive direction is a direction from the front pillar 3 toward the eye point 1, and the Z-axis positive direction is a direction from a body floor side of the vehicle toward a body roof along the front pillar 3.

The optical device 4 includes blind spot-side outward mirrors 30R, 30L, blind spot-side inward mirrors 40R, 40L, eye point-side inward mirrors 20R, 20L, and eye point-side outward mirrors 10R, 10L.

The blind spot-side outward mirrors 30R, 30L are disposed on the blind spot-side (a vehicle outside) of the line of sight with respect to the front pillar 3. The blind spot-side outward mirrors 30R, 30L reflect incident light in the Y-axis positive direction from the blind spot-side, in the X-axis positive direction and the X-axis negative direction that are directions crossing the line of sight and away from the front pillar 3. The blind spot-side inward mirrors 40R, 40L are disposed so as to respectively face the blind spot-side outward mirrors 30R, 30L. The blind spot-side inward mirrors 40R, 40L reflect the light in the X-axis positive direction and the light in the X-axis negative direction, which are reflected by the blind spot-side outward mirrors 30R, 30L, in the Y-axis positive direction toward the eye point 1.

The eye point-side inward mirrors 20R, 20L are disposed on the eye point 1-side (a vehicle inside) of the line of sight with respect to the front pillar 3. The eye point-side inward mirrors 20R, 20L reflect the light in the Y-axis positive direction, which is reflected by the blind spot-side inward mirrors 40R, 40L, in the X-axis negative direction and the X-axis positive direction that are the directions crossing the line of sight and approaching the front pillar 3. The eye point-side outward mirrors 10R, 10L are disposed so as to respectively face the eye point-side inward mirrors 20R, 20L. The eye point-side outward mirrors 10R, 10L reflect the light in the X-axis negative direction and the light in the X-axis positive direction, which are reflected by the eye point-side inward mirrors 20R, 20L, in the Y-axis positive direction toward the eye point 1-side of the line of sight.

The blind spot-side outward mirrors 30R, 30L and the eye point-side outward mirrors 10R, 10L constitute an outward mirror unit.

The blind spot-side outward mirrors 30R, 30L are separately disposed in the X-axis positive direction and the X-axis negative direction, respectively, on the blind spot-side. Each of the blind spot-side outward mirrors 30R, 30L extends along the Z-axis. Each of the blind spot-side outward mirrors 30R, 30L has one flat reflection surface that reflects the light. The reflection surface of each of the blind spot-side outward mirrors 30R, 30L is disposed so as to face the blind spot-side, and is inclined from the X-axis positive direction or the X-axis negative direction, which is the direction orthogonal to the line of sight and away from the front pillar 3, toward the eye point-side of the line of sight at a first angle $\theta_1$. More specifically, the blind spot-side outward mirror 30R is oriented toward the Y-axis positive direction at the angle of 45° ($=\theta_1$) with respect to the X-axis positive direction, and the blind spot-side outward mirror 30L is oriented toward the Y-axis positive direction at the angle of 45° ($=\theta_1$) with respect to the X-axis negative direction.

The eye point-side outward mirrors 10R, 10L are separately disposed in the X-axis positive direction and the X-axis negative direction, respectively, on the eye point 1 side. Each of the eye point-side outward mirrors 10R, 10L extends along the Z-axis. Each of the eye point-side outward mirrors 10R, 10L has one flat reflection surface that reflects the light. The reflection surface of each of the eye point-side outward mirrors 10R, 10L is disposed so as to face the eye point 1-side, and is inclined from the X-axis positive direction or the X-axis negative direction, which is the direction orthogonal to the line of sight and away from the front pillar 3, toward the blind spot-side of the line of sight at the first angle $\theta_1$. More specifically, the eye point-side outward mirror 10R is oriented toward the Y-axis negative direction at the angle of 45° ($=\theta_1$) with respect to the X-axis positive direction, and the eye point-side outward mirror 10L is oriented toward the Y-axis negative direction at the angle of 45° ($=\theta_1$) with respect to the X-axis negative direction.

The blind spot-side inward mirrors 40R, 40L and the eye point-side inward mirrors 20R, 20L constitute an inward mirror unit.

The blind spot-side inward mirrors 40R, 40L are separately disposed in the X-axis positive direction and the X-axis negative direction, respectively, on the blind spot-side. Each of the blind spot-side inward mirrors 40R, 40L extends along the Z-axis. The eye point-side inward mirrors 20R, 20L are separately disposed in the X-axis positive direction and the X-axis negative direction, respectively, on the eye point 1-side. Each of the eye point-side inward mirrors 20R, 20L extends along the Z-axis.

Each of the blind spot-side inward mirrors 40R, 40L and the eye point-side inward mirrors 20R, 20L is configured by arranging mirror pieces 50, each of which has a reflection surface 51, at specified angles. All the mirror pieces 50 have the same size in this embodiment. As shown in an enlarged view in FIG. 2, each of the mirror pieces 50 has an isosceles right triangle cross section and has a three-dimensional shape that extends in the Z-axis direction. A surface of the mirror piece 50 that corresponds to a long side of the isosceles right triangle is the reflection surface 51 that reflects the light. In other words, each of the blind spot-side inward mirrors 40R, 40L and the eye point-side inward mirrors 20R, 20L has the plurality of reflection surfaces 51 (partial reflection surfaces 51).

The reflection surface 51 of each of the mirror pieces 50 provided in the blind spot-side inward mirrors 40R, 40L is inclined toward the blind spot-side of the line of sight at the first angle $\theta_1$ with respect to the X-axis negative direction or the X-axis positive direction, which is a direction orthogonal to the line of sight and approaching the front pillar 3. An arrangement direction d4 of the mirror pieces 50 provided in each of the blind spot-side inward mirrors 40R, 40L (i.e., an arrangement direction d4 in which the mirror pieces 50 are arranged) is inclined from the X-axis positive direction or the X-axis negative direction, which is the direction orthogonal to the line of sight and away from the front pillar 3, toward the eye point-side of the line of sight at a second angle $\theta_2$ that is larger than the first angle $\theta_1$.

In this embodiment, the mirror pieces 50 that constitute the blind spot-side inward mirror 40R are disposed such that the reflection surface 51 of each of the mirror pieces 50 is oriented toward the Y-axis negative direction at the angle of 45° ($=\theta_1$) with respect to the X-axis negative direction, and are further arranged such that the arrangement direction d4 of the mirror pieces 50 is inclined toward the Y-axis positive direction at the angle ($=\theta_2$) that is larger than 45° and smaller than 90° with respect to the X-axis positive direction. Similarly, the mirror pieces 50 that constitute the blind spot-side inward mirror 40L are disposed such that the reflection surface 51 of each of the mirror pieces 50 is oriented toward the Y-axis negative direction at the angle of 45° ($=\theta_1$) with respect to the X-axis positive direction, and are further arranged such that the arrangement direction d4 of the mirror pieces 50 is inclined toward the Y-axis positive direction at the angle ($=\theta_2$) that is larger than 45° and smaller than 90° with respect to the X-axis negative direction.

The mirror pieces 50 that are provided in the blind spot-side inward mirrors 40R, 40L are arranged such that the reflection surfaces 51 are parallel to each other, and are arranged at positions where each of the reflection surfaces 51 partially overlaps the reflection surface 51 of the adjacent minor piece 50 when seen from the eye point 1-side.

The reflection surface 51 of each of the mirror pieces 50 provided in the eye point-side inward minors 20R, 20L is inclined toward the eye point 1-side of the line of sight at the first angle $\theta_1$ with respect to the X-axis negative direction or the X-axis positive direction, which is the direction orthogonal to the line of sight and approaching the front pillar 3. An arrangement direction d2 of the mirror pieces 50 provided in each of the eye point-side inward minors 20R, 20L (i.e., an arrangement direction d2 in which the minor pieces 50 are arranged) is inclined from the X-axis positive direction or the X-axis negative direction, which is the direction orthogonal to the line of sight and away from the front pillar 3, toward the blind spot-side of the line of sight at the second angle $\theta_2$ that is larger than the first angle $\theta_1$.

In this embodiment, the minor pieces 50 that constitute the eye point-side inward minor 20R are disposed such that the reflection surface 51 of each of the mirror pieces 50 is oriented toward the Y-axis positive direction at the angle of 45° ($=\theta_1$) with respect to the X-axis negative direction, and are further arranged such that the arrangement direction d2 of the mirror pieces 50 is inclined toward the Y-axis negative direction at the angle ($=\theta_2$) that is larger than 45° and smaller than 90° with respect to the X-axis positive direction. Similarly, the mirror pieces 50 that constitute the eye point-side inward minor 20L are disposed such that the reflection surface 51 of each of the minor pieces 50 is oriented toward the Y-axis positive direction at the angle of 45° ($=\theta_1$) with respect to the X-axis positive direction, and are further arranged such that the arrangement direction d2 of the mirror pieces 50 is inclined toward the Y-axis negative direction at the angle ($=\theta_2$) that is larger than 45° and smaller than 90° with respect to the X-axis negative direction.

Note that each of the above angles $\theta_2$ is the same value and can be set at any angle within a range of 45°<$\theta_2$<90°.

The minor pieces 50 that are provided in the eye point-side inward mirrors 20R, 20L are arranged such that the reflection surfaces 51 are parallel to each other and arranged at positions where each of the reflection surfaces 51 partially overlaps the reflection surface 51 of the adjacent mirror piece 50 when seen from the blind spot-side.

With the above configuration, the optical device 4 reflects incident light E from the blind spot-side in the X-axis positive direction and the X-axis negative direction with the use of the blind spot-side outward mirrors 30R, 30L, and then reflects the light E in the Y-axis positive direction with the use of the blind spot-side inward mirrors 40R, 40L. Then, the optical device 4 reflects the light E in the X-axis negative direction and the X-axis positive direction with the use of the eye point-side inward mirrors 20R, 20L, and further reflects the light E in the Y-axis positive direction with the use of the eye point-side outward mirrors 10R, 10L. In this way, the incident light E from the blind spot-side can be emitted toward the eye point 1, and the image of the blind spot can be displayed at the position of the front pillar 3 when seen from the eye point 1. Therefore, the front pillar 3 can be made transparent and thus the front pillar 3 does not block the line of sight. This allows the driver to see a spot beyond the front pillar 3 and can assist the driver in recognizing the image of the blind spot.

In this embodiment, the reflection surfaces of the blind spot-side outward mirrors 30R, 30L, the reflection surfaces 51 provided in the blind spot-side inward mirrors 40R, 40L, the reflection surfaces 51 provided in the eye point-side inward mirrors 20R, 20L, and the reflection surfaces of the eye point-side outward mirrors 10R, 10L are all inclined at the same inclination angle, that is, the first angle $\theta_1$. In addition, the arrangement direction d4 of the reflection surfaces 51 provided in each of the blind spot-side inward mirrors 40R, 40L and the arrangement direction d2 of the reflection surfaces 51 provided in each of the eye point-side inward mirrors 20R, 20L are inclined at the same angle, that is, the second angle $\theta_2$. In this way, the incident light from the blind spot-side can be emitted toward the eye point without offsetting a position of the light, and the image of the blind spot can be displayed at the position of the front pillar 3 when seen from the eye point. Therefore, the obstacle can be reliably made transparent.

Figure 3:
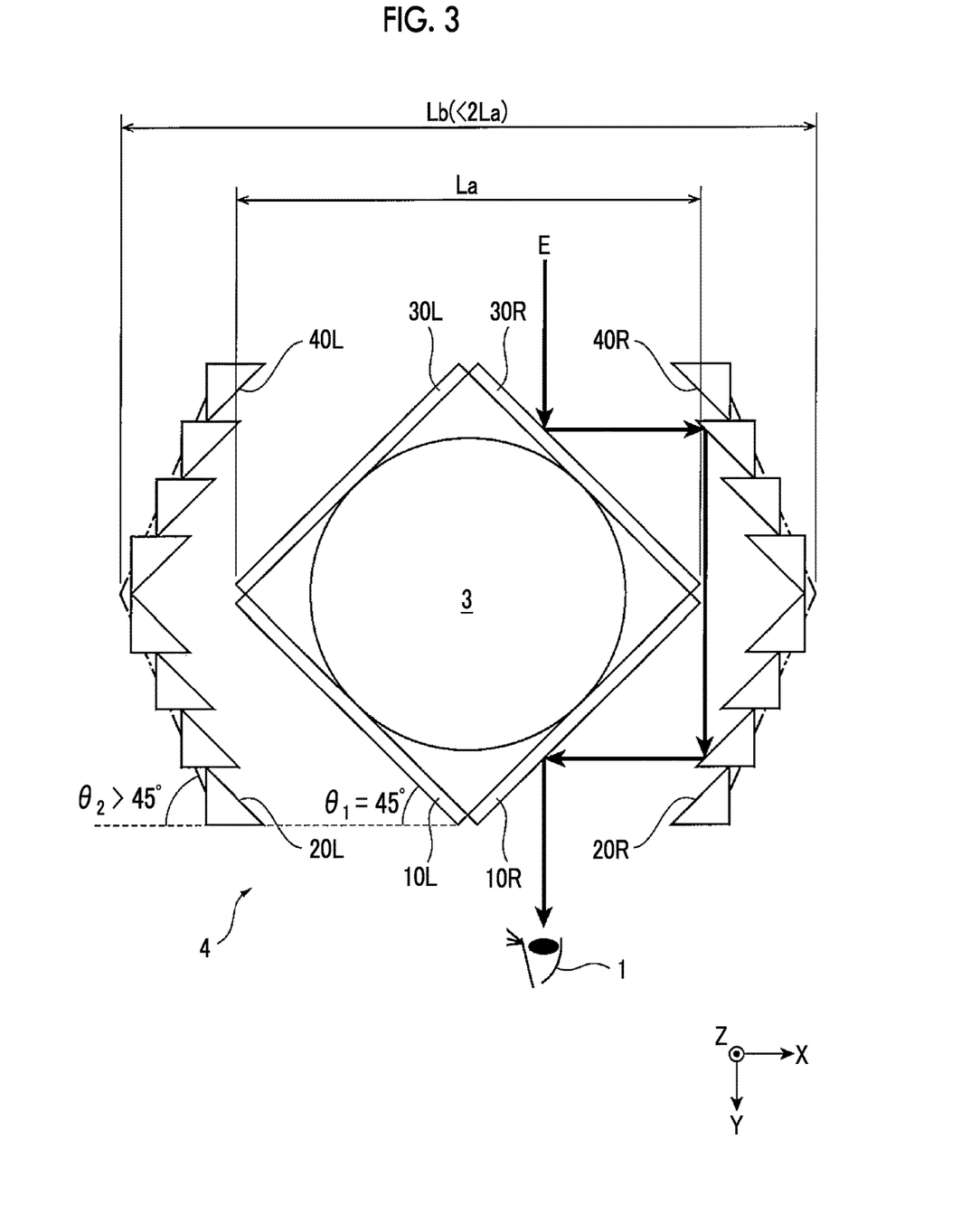
FIG. 3 is a plan view illustrating size of the optical device in the embodiment.
Figure 4:
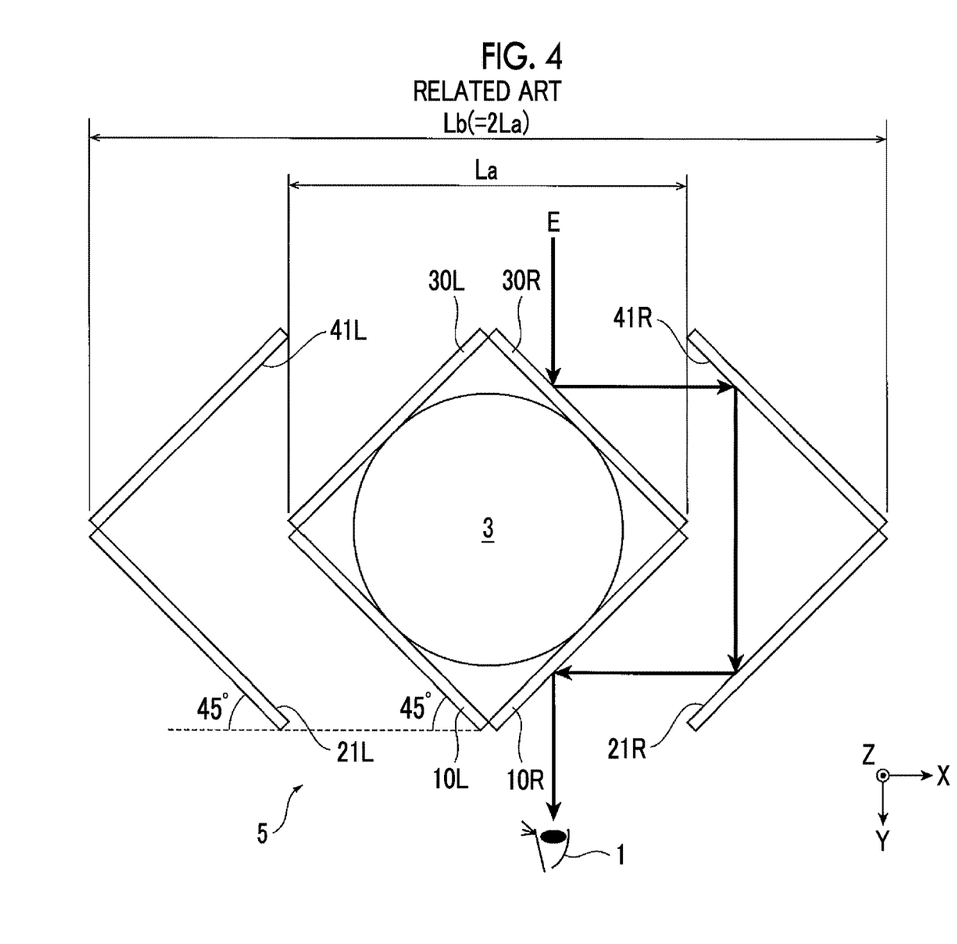
FIG. 4 is a plan view illustrating a configuration and size of a reference example as a premise of the embodiment.

FIG. 3 is a plan view illustrating size of the optical device in this embodiment. FIG. 4 is a plan view illustrating a configuration and size of a reference example as a premise of this embodiment. Note that the same components of an optical device 5 in the reference example shown in FIG. 4 as those of the optical device 4 in this embodiment will be denoted by the same reference numerals and symbols, and will not be described in detail.

In the optical device 4 in this embodiment shown in FIG. 3, each of the blind spot-side inward mirrors 40R, 40L and the eye point-side inward mirrors 20R, 20L includes the mirror pieces 50, and each of the angles of the arrangement directions d4, d2 is set to the angle $\theta_2$ that is larger than 45°. Thus, in the case where size of the outward mirror unit, which includes the blind spot-side outward mirrors 30R, 30L and the eye point-side outward mirrors 10R, 10L, from one end to the other end in the X-axis direction is set as La and size of the inward mirror unit, which includes the blind spot-side inward mirrors 40R, 40L and the eye point-side inward mirrors 20R, 20L, from one end to the other end in the X-axis direction is set as Lb, the size Lb of the inward mirror unit in the X-axis direction is smaller than twice the size La of the outward mirror unit in the X-axis direction (Lb<2La).

In the optical device 5 in the reference example shown in FIG. 4, each of blind spot-side inward mirrors 41R, 41L and eye point-side inward mirrors 21R, 21L has one flat reflection surface, similarly to the blind spot-side outward mirrors 30R, 30L and the eye point-side outward mirrors 10R, 10L. The blind spot-side inward mirrors 41R, 41L are disposed so as to face the blind spot-side outward mirrors 30R, 30L, respectively. Each of the blind spot-side inward mirrors 41R, 41L is inclined toward the Y-axis positive direction at an angle of 45° with respect to the X-axis positive direction or inclined toward the Y-axis negative direction at an angle of 45° with respect to the X-axis positive direction. The eye point-side inward mirrors 21R, 21L are disposed so as to face the eye point-side outward mirrors 10R, 10L, respectively. Each of the eye point-side inward mirrors 21R, 21L is inclined toward the Y-axis positive direction at an angle of 45° with respect to the X-axis negative direction or inclined toward the Y-axis negative direction at an angle of 45° with respect to the X-axis negative direction.

The optical device 5 in the reference example reflects the incident light E from the blind spot-side in the X-axis positive direction and the X-axis negative direction with the use of the blind spot-side outward mirrors 30R, 30L, and then reflects the light E in the Y-axis positive direction with the use of the blind spot-side inward mirrors 41R, 41L. Then, the optical device 5 reflects the light E in the X-axis negative direction and the X-axis positive direction with the use of the eye point-side inward mirrors 21R, 21L, and further reflects the light E in the Y-axis positive direction with the use of the eye point-side outward mirrors 10R, 10L. In this way, the light E can be emitted toward the eye point 1, and the image of the blind spot can be displayed at the position of the front pillar 3. Therefore, the front pillar 3 can be made transparent and thus the front pillar 3 does not block the line of sight.

In the case of the optical device 5 in the reference example, the size Lb of the inward mirror unit, which includes the blind spot-side inward mirrors 41R, 41L and the eye point-side inward mirrors 21R, 21L, in the X-axis direction is twice the size La of the outward mirror unit, which includes the blind spot-side outward mirrors 30R, 30L and the eye point-side outward mirrors 10R, 10L, in the X-axis direction (Lb=2La).

In the optical device 5 in the reference example, each of the blind spot-side inward mirrors 41R, 41L and the eye point-side inward mirrors 21R, 21L has the one flat reflection surface. Thus, in order to make the front pillar 3 transparent by the reflection of the light, it is necessary to dispose each of the reflection surfaces of the inward mirror unit at the angle of 45° with respect to the X-axis direction. Thus, size of the entire device in the X-axis direction becomes twice the size of the obstacle to be made transparent (the front pillar 3 in this embodiment). When the size of the obstacle to be made transparent is increased, the size of the optical device 5 is also increased.

However, in the optical device 4 in this embodiment, the blind spot-side inward mirrors 40R, 40L and the eye point-side inward mirrors 20R, 20L, which constitute the inward mirror unit, each include the mirror pieces 50, and the angles of the arrangement directions d4, d2 with respect to the X-axis direction are each set to the angle $\theta_2$ that is larger than 45° (45°<$\theta_2$<90°). Therefore, the size Lb of the inward mirror unit can be made smaller than twice the size La of the outward mirror unit (Lb<2La).

Thus, as compared to the optical device 5 in the reference example, in the optical device 4, a distance of each of the blind spot-side inward mirrors 40R, 40L and the eye point-side inward mirrors 20R, 20L from the front pillar 3 in the X-axis direction can be reduced, and thus the size of the entire device can be reduced, that is, the entire device can be made further compact. Therefore, when the compact optical device 4 in this embodiment is used particularly at a position with a limited space such as a cabin of the vehicle, an occupant is not annoyed by the optical device 4, and thus the optical device 4 enhances convenience.

Figure 5:
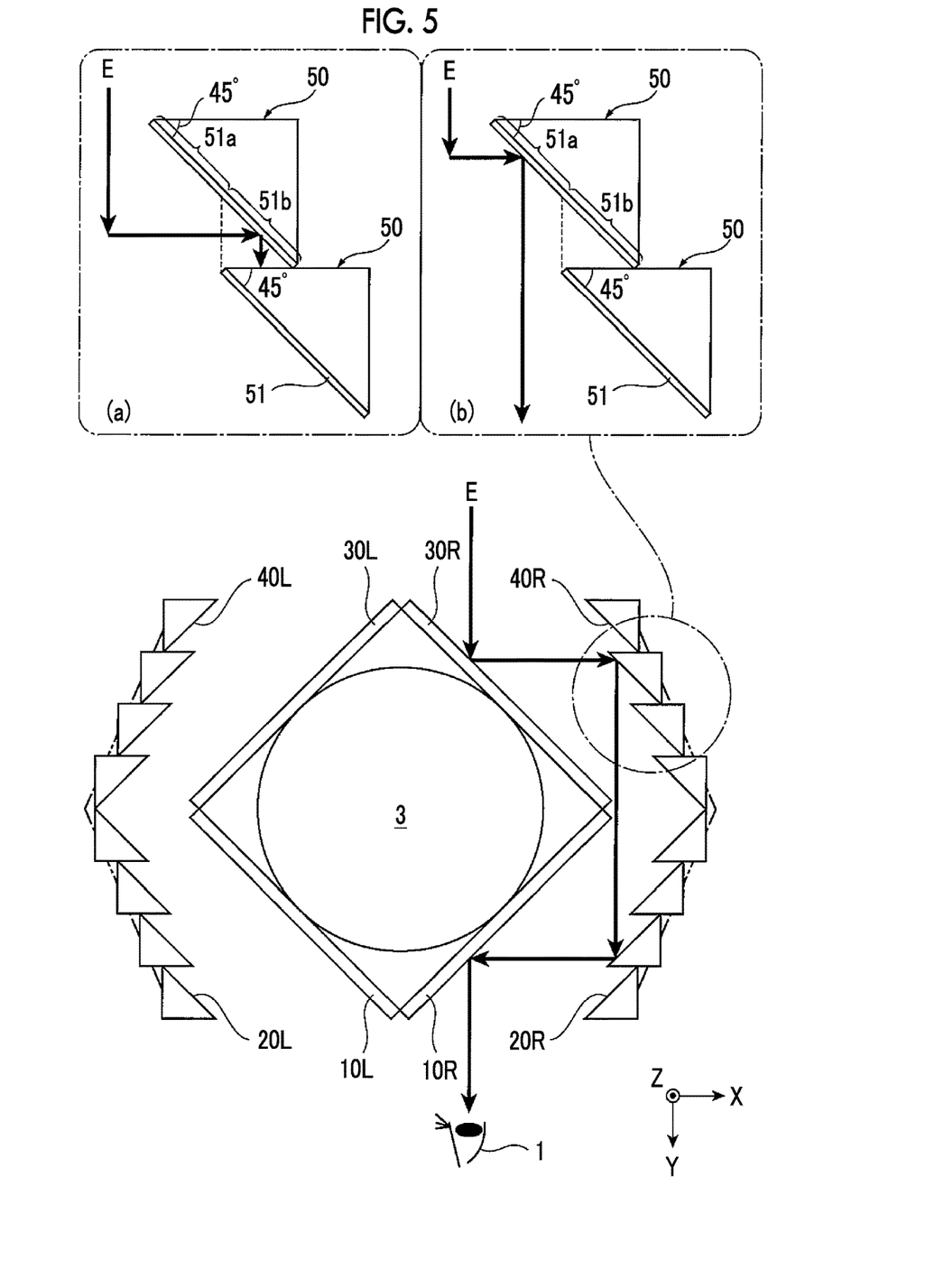
FIG. 5 is a plan view illustrating arrangement of reflection surfaces.
Figure 6:
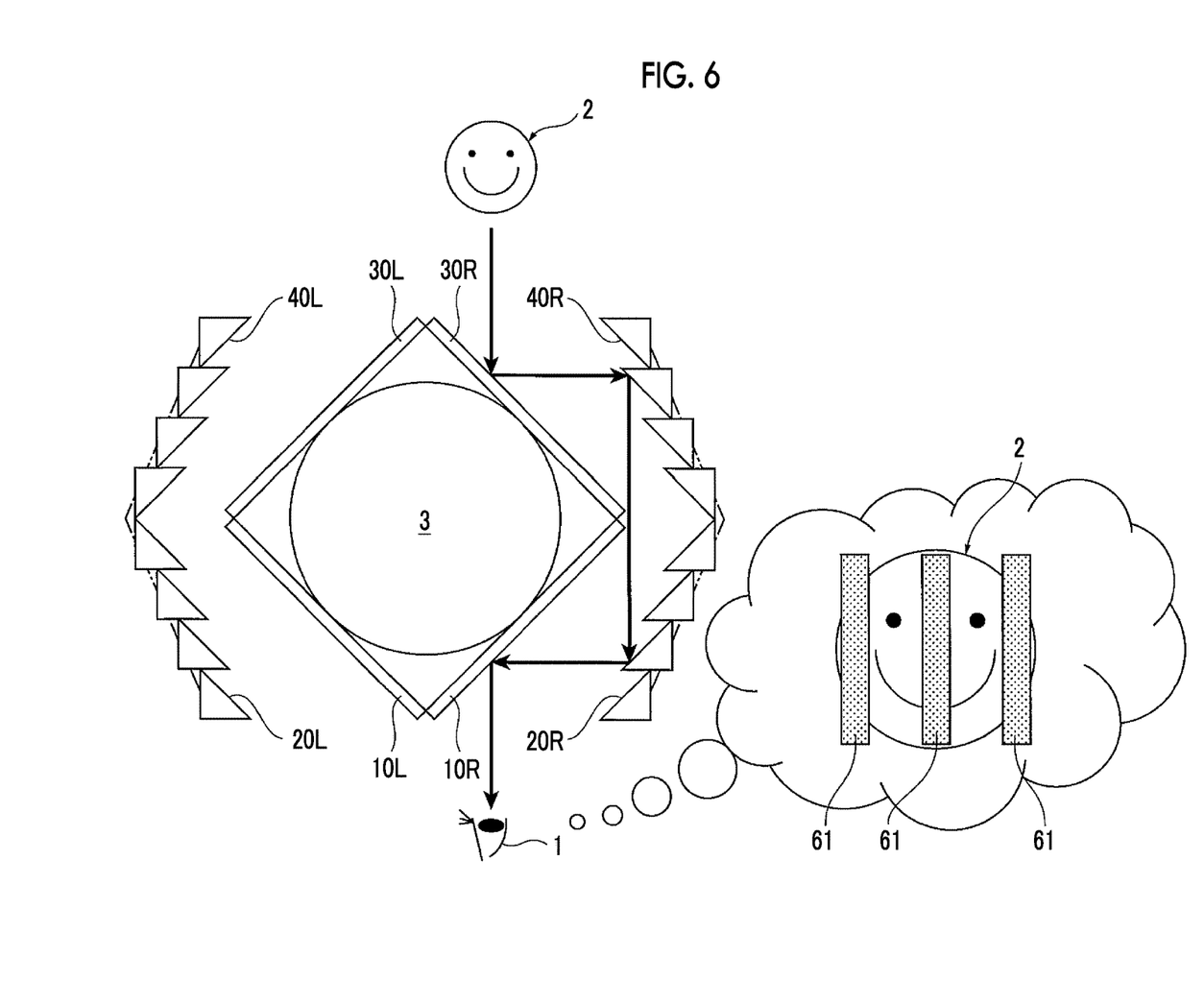
FIG. 6 illustrates an image of an invisible region that is displayed by the optical device in the embodiment.

FIG. 5 is a plan view illustrating arrangement of reflection surfaces. FIG. 6 is an image of an invisible region that is displayed by the optical device in this embodiment.

As described above, the blind spot-side inward mirrors 40R, 40L and the eye point-side inward mirrors 20R, 20L, which constitute the inward mirror unit, each include the plurality of reflection surfaces 51 (partial reflection surfaces 51). The reflection surfaces 51 are arranged in parallel with each other and arranged at the positions where the reflection surfaces 51 partially overlap with each other when seen from the blind spot-side or the eye point-side. For example, as shown in partial enlarged views (a) and (b) in FIG. 5, the reflection surface 51 of each of the mirror pieces 50 in the blind spot-side inward mirror 40R is inclined toward the Y-axis positive direction at the angle of 45° with respect to the X-axis positive direction, and is arranged at the position where the reflection surface 51 partially overlaps the reflection surface 51 of the adjacent mirror piece 50. Thus, when seen in the Y-axis negative direction, an overlapping portion 51b of each of the mirror pieces 50 is hidden, and only a portion 51a of each of the mirror pieces 50 is exposed.

Accordingly, as shown in (a) in FIG. 5, a path of the light E that is reflected by the overlapping portion 51b of one of the mirror pieces 50 is blocked by the mirror piece 50 on the eye point 1-side, and thus the light E reflected by the overlapping portion 51b does not reach the eye point 1. As shown in (b) in FIG. 5, the light E that is reflected by the exposed portion 51a of one of the mirror pieces 50 reaches the eye point 1. Thus, in this embodiment, the inward mirror unit is configured by arranging the mirror pieces 50 such that the mirror pieces 50 partially overlap with each other. Thus, when seen from the eye point 1, an invisible region 61 (see FIG. 6) that is a striped invisible region is generated in the image of the blind spot. That is, the portion 5 1b where the mirror pieces 50 overlap with each other is displayed as the invisible region 61. Thus, as shown in the image in FIG. 6, the object 2 looks as if a shutter is partially closed in the image of the blind spot. Therefore, unlike the optical device 5 in the reference example, the front pillar 3 cannot be made transparent completely, and the entire object 2, which exists in the blind spot, cannot be displayed perfectly.

However, by changing the angle $\theta_2$ of the arrangement directions d4, d2 of the minor pieces 50 and the number of the mirror pieces 50 in the optical device 4 of this embodiment, it is possible to change an area of the invisible region that is visually recognized and the number of lines of the invisible region 61. Thus, by adjusting the angle $\theta_2$ and the number of the mirror pieces 50 to appropriate values, the object 2, which exists in the blind spot, can be displayed although the object 2 is finely segmented. Therefore, the driver can easily recognize existence of the object 2.

Figure 7:
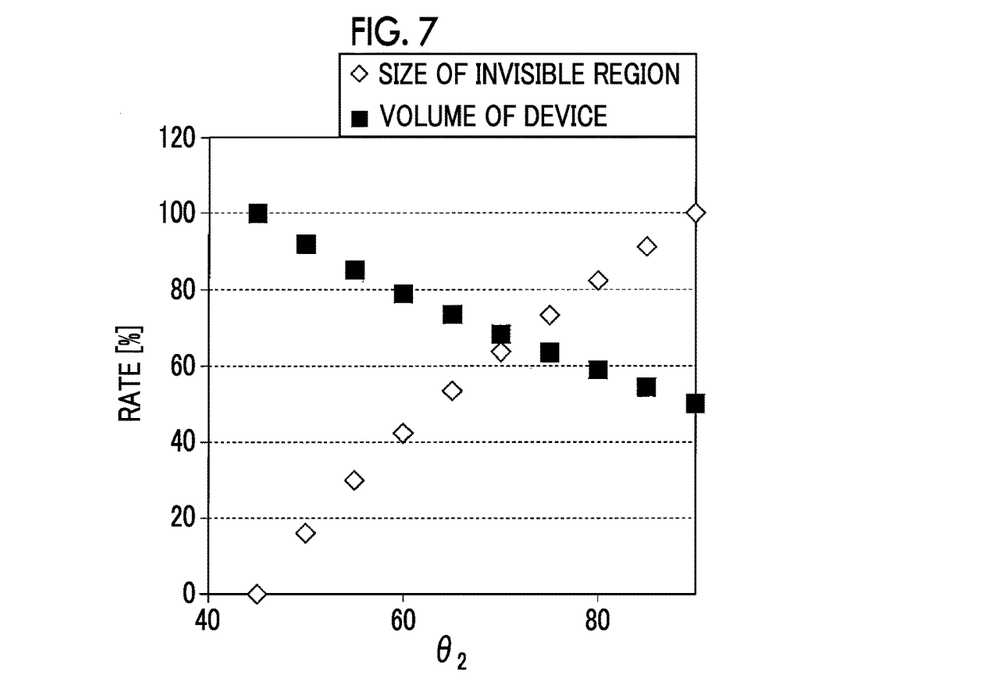
FIG. 7 is a graph representing a relationship between an angle of an arrangement direction of mirror pieces, and size of the invisible region and a volume of the device.

FIG. 7 is a graph representing a relationship between the angle of an arrangement direction of the mirror pieces 50, and size of the invisible region and a volume of the device.

In the optical device 4, the size of the invisible region 61 and the volume of the device are determined by the angle $\theta_2$ of the arrangement directions d4, d2 of the mirror pieces 50. The size of the invisible region in the case of $45°<\theta_2<90°$ is expressed by the rate when the size of the invisible region in the case of the angle $\theta_2=90°$ is set to 100%. In this way, a size rate of the invisible region is acquired. For example, when the angle $\theta_2$ is reduced from 90°, the size rate of the invisible region is also reduced. In the case of $\theta_2=45°$, the invisible region does not exist, and thus the size rate of the invisible region becomes 0%.

The volume of the device in the case of $45°<\theta_2<90°$ is expressed by the rate when the volume of the device in the case of the angle $\theta_2=45°$ is set to 100%. In this way, a volume rate of the device is acquired. For example, when the angle $\theta_2$ is increased from 45°, the volume of the device is reduced, and the device is downsized. In the case of $\theta_2=90°$, the volume of the device becomes 60% or smaller.

Figure 8:
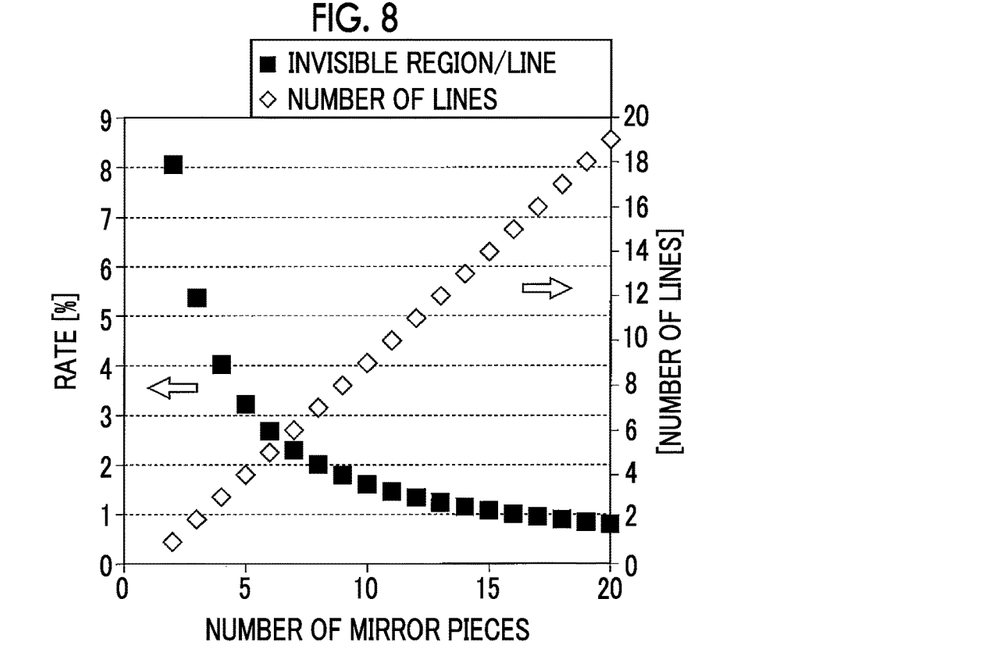
FIG. 8 is a graph representing a relationship between the number of the mirror pieces, and the number of lines of the invisible region and line width in the invisible region.

FIG. 8 is a graph representing a relationship between the number of the mirror pieces 50, and the number of lines of the invisible region 61 and the size of the invisible region per line.

FIG. 8 shows the size of the invisible region per line expressed by the rate, that is, the size rate of the invisible region per line in a case where the angle $\theta_2$ is 50° and the number of the mirror pieces 50 is two to twenty.

For example, in the case where the size of each of the mirror pieces 50 is reduced and the number of the mirror pieces 50 is increased, line width as the size of the invisible region per line is reduced, and the number of the lines is increased. Thus, the line width in the invisible region 61 can be adjusted by adjusting the number of the mirror pieces 50. Unless the angle $\theta_2$ is changed, the area of the entire invisible region is not changed.

The number of the mirror pieces and the size of each mirror piece can be set to any values.

Thus, it is possible to reduce the size of the entire optical device 4 in this embodiment, while maintaining a function of making the front pillar 3 transparent by displaying the image of the blind spot at the position of the front pillar 3 when seen from the eye point 1.

Although the embodiment of the disclosure has been described in detail so far, the disclosure is not limited to the embodiment described above, and various modifications can be made to the embodiment without departing from the scope of the disclosure. For example, in the above embodiment, the optical device 4 is attached to the vehicle. However, a target to which the optical device 4 is attached is not limited to the vehicle, and thus the optical device 4 may be attached to other objects.

In addition, in the above embodiment, all the mirror pieces 50 have the same size. However, the size of each of the mirror pieces 50 may be changed in accordance with a position at which the mirror piece 50 is disposed. For example, the size of each of the mirror pieces 50 may be changed such that the line width in the invisible region 61 is narrow and the number of the lines of the invisible region 61 is large in a central portion of the image of the blind spot and that the line width in the invisible region 61 is wide and the number of the lines of the invisible region is small in each end portion of the image of the blind spot.

What is claimed is:

1. An optical device displaying an image of a blind spot where a line of sight is blocked by an obstacle, the optical device comprising:
   a blind spot-side outward mirror disposed on a blind spot-side of the line of sight with respect to the obstacle, and reflecting incident light from the blind spot-side, in a direction crossing the line of sight and away from the obstacle;
   a blind spot-side inward mirror disposed so as to face the blind spot-side outward mirror, and reflecting the light that is reflected by the blind spot-side outward mirror, toward an eye point-side of the line of sight;

an eye point-side inward mirror disposed on the eye point-side of the line of sight with respect to the obstacle, and reflecting the light that is reflected by the blind spot-side inward mirror, in a direction crossing the line of sight and approaching the obstacle; and an eye point-side outward mirror disposed so as to face the eye point-side inward mirror, and reflecting the light that is reflected by the eye point-side inward mirror, toward the eye point-side of the line of sight along the line of sight, wherein each of the blind spot-side inward mirror and the eye point-side inward mirror has a plurality of reflection surfaces, and the reflection surfaces are arranged in parallel with each other and arranged at positions where the reflection surfaces partially overlap with each other when seen from the blind spot-side or the eye point-side.

2. The optical device according to claim 1, wherein:

a reflection surface of the blind spot-side outward mirror is inclined toward the eye point-side of the line of sight at a first angle with respect to a direction orthogonal to the line of sight and away from the obstacle;

each of the reflection surfaces provided in the blind spot-side inward mirror is inclined toward the blind spot-side of the line of sight at the first angle with respect to a direction orthogonal to the line of sight and approaching the obstacle;

each of the reflection surfaces provided in the eye point-side inward mirror is inclined toward the eye point-side of the line of sight at the first angle with respect to the direction orthogonal to the line of sight and approaching the obstacle;

a reflection surface of the eye point-side outward mirror is inclined toward the blind spot-side of the line of sight at the first angle with respect to the direction orthogonal to the line of sight and away from the obstacle;

an arrangement direction of the reflection surfaces of the blind spot-side inward mirror is inclined toward the eye point-side of the line of sight at a second angle that is larger than the first angle with respect to the direction orthogonal to the line of sight and away from the obstacle; and an arrangement direction of the reflection surfaces of the eye point-side inward mirror is inclined toward the blind spot-side of the line of sight at the second angle with respect to the direction orthogonal to the line of sight and away from the obstacle.

3. The optical device according to claim 2, wherein the first angle is 45°, and the second angle is an angle that is larger than 45° and smaller than 90°.

* * * * *

UNITED STATES PATENT AND TRADEMARK OFFICE
CERTIFICATE OF CORRECTION

PATENT NO. : 10,347,133 B2  
APPLICATION NO. : 15/886148  
DATED : July 9, 2019  
INVENTOR(S) : Mayu Takagi et al.

Page 1 of 1

It is certified that error appears in the above-identified patent and that said Letters Patent is hereby corrected as shown below:

On the Title Page

Item (57), Abstract, Line 5, delete "minor;" and insert --mirror;--, therefor.

Item (57), Abstract, Line 7, delete "minor" and insert --mirror--, therefor.

In the Specification

In Column 6, Line 31, delete "minor" and insert --mirror--, therefor.

In Column 6, Line 33, delete "minors" and insert --mirrors--, therefor.

In Column 6, Line 39, delete "minors" and insert --mirrors--, therefor.

In Column 6, Line 40, delete "minor" and insert --mirror--, therefor.

In Column 6, Line 46, delete "minor" and insert --mirror--, therefor.

In Column 6, Line 47, delete "minor" and insert --mirror--, therefor.

In Column 6, Line 56, delete "minor" and insert --mirror--, therefor.

In Column 6, Line 57, delete "minor" and insert --mirror--, therefor.

In Column 6, Line 66, delete "minor" and insert --mirror--, therefor.

Signed and Sealed this  
Twenty-ninth Day of October, 2019

Andrei Iancu  
*Director of the United States Patent and Trademark Office*